(12) United States Patent
Duan et al.

(10) Patent No.: US 12,022,354 B2
(45) Date of Patent: Jun. 25, 2024

(54) LOW-TIER USER EQUIPMENT POSITIONING WITH PREMIUM USER EQUIPMENT ASSISTANCE

(71) Applicant: QUALCOMM Incorporated, San Diego, CA (US)

(72) Inventors: Weimin Duan, San Diego, CA (US); Alexandros Manolakos, Escondido, CA (US); Huilin Xu, San Diego, CA (US); Seyedkianoush Hosseini, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 17/038,294

(22) Filed: Sep. 30, 2020

(65) Prior Publication Data

US 2021/0099832 A1 Apr. 1, 2021

Related U.S. Application Data

(60) Provisional application No. 62/908,648, filed on Oct. 1, 2019.

(51) Int. Cl.
*H04W 4/02* (2018.01)
*G01S 11/06* (2006.01)
(Continued)

(52) U.S. Cl.
CPC ............ *H04W 4/023* (2013.01); *G01S 11/06* (2013.01); *H04B 17/318* (2015.01);
(Continued)

(58) Field of Classification Search
CPC ....... H04W 4/023; H04W 8/24; H04W 24/10; H04W 64/006; H04W 92/18;
(Continued)

(56) References Cited

U.S. PATENT DOCUMENTS

| 2013/0030684 A1 | 1/2013 | Wirola |
| 2014/0162688 A1* | 6/2014 | Edge ..................... H04W 4/06 455/456.1 |

(Continued)

OTHER PUBLICATIONS

International Search Report and Written Opinion—PCT/US2020/053832—ISA/EPO—dated Mar. 15, 2021.
(Continued)

*Primary Examiner* — William Nealon
(74) *Attorney, Agent, or Firm* — QUALCOMM Incorporated

(57) ABSTRACT

Disclosed are techniques for wireless positioning. In an aspect, a reduced-capability user equipment (UE) receives, from each of one or more premium UEs, one or more parameters indicating a quality of a location estimate of the premium UE, selects at least one premium UE based on the quality of the location estimate of the at least one premium UE, and derives a location estimate of the reduced-capability UE based on the location estimate of the at least one premium UE. In another aspect, a reduced-capability UE transmits, to at least one premium UE, a request to perform one or more positioning measurements of one or more downlink reference signals, receives, from the at least one premium UE, a measurement report comprising the one or more positioning measurements, and determines a location estimate of the reduced-capability UE based on the one or more positioning measurements in the measurement report.

64 Claims, 12 Drawing Sheets

(51) Int. Cl.
    *H04B 17/318*   (2015.01)
    *H04L 5/00*     (2006.01)
    *H04W 8/24*     (2009.01)
    *H04W 24/10*    (2009.01)
    *H04W 64/00*    (2009.01)
    *H04L 25/02*    (2006.01)
    *H04W 92/18*    (2009.01)

(52) U.S. Cl.
    CPC ............. *H04L 5/0051* (2013.01); *H04W 8/24* (2013.01); *H04W 24/10* (2013.01); *H04W 64/006* (2013.01); *H04L 25/0226* (2013.01); *H04W 92/18* (2013.01)

(58) Field of Classification Search
    CPC .... H04L 25/0226; H04L 5/0051; G02S 11/06; H04B 17/318
    USPC ...................................................... 455/456.1
    See application file for complete search history.

(56) References Cited

U.S. PATENT DOCUMENTS

| | | | |
|---|---|---|---|
| 2015/0170504 A1* | 6/2015 | Jooste | A61B 5/0205 340/539.12 |
| 2016/0050531 A1* | 2/2016 | Choi | H04W 4/023 455/456.2 |
| 2016/0095080 A1* | 3/2016 | Khoryaev | G01S 5/0284 455/456.1 |
| 2016/0095092 A1* | 3/2016 | Khoryaev | H04W 4/50 370/329 |
| 2016/0174034 A1* | 6/2016 | Gao | H04W 24/10 455/456.2 |
| 2016/0360354 A1* | 12/2016 | Rhee | G01S 5/0263 |
| 2017/0359694 A1* | 12/2017 | Jensen | G01S 19/34 |
| 2018/0227702 A1* | 8/2018 | Bitra | H04W 4/023 |

OTHER PUBLICATIONS

Partial International Search Report—PCT/US2020/053832—ISA/EPO—dated Jan. 20, 2021.
Taiwan Search Report—TW109134479—TIPO—Mar. 14, 2024.

\* cited by examiner

LOW-TIER USER EQUIPMENT POSITIONING WITH PREMIUM USER EQUIPMENT ASSISTANCE

CROSS-REFERENCE TO RELATED APPLICATIONS

The present Application for Patent claims the benefit of U.S. Provisional Application No. 62/908,648, entitled "LOW-TIER USER EQUIPMENT POSITIONING WITH PREMIUM USER EQUIPMENT ASSISTANCE," filed Oct. 1, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a reduced-capability user equipment (UE) includes receiving, from each of one or more premium UEs, one or more parameters indicating a quality of a location estimate of the premium UE; selecting at least one premium UE of the one or more premium UEs based on the quality of the location estimate of the at least one premium UEs; and deriving a location estimate of the reduced-capability UE based on the location estimate of the at least one premium UE.

In an aspect, a method of wireless positioning performed by a reduced-capability UE includes transmitting, to at least one premium UE, a request to perform one or more positioning measurements of one or more downlink reference signals transmitted by one or more transmission-reception points (TRPs); receiving, from the at least one premium UE, a measurement report comprising the one or more positioning measurements; and determining a location estimate of the reduced-capability UE based on the one or more positioning measurements in the measurement report.

In an aspect, a method of wireless positioning performed by a premium UE includes receiving, from a reduced-capability UE, one or more uplink reference signals; and performing one or more positioning measurements of the one or more uplink reference signals, wherein a location estimate of the reduced-capability UE is calculated based on the one or more positioning measurements.

In an aspect, a reduced-capability UE includes a memory; at least one transceiver; and at least one processor communicatively coupled to the memory and the at least one transceiver, the at least one processor configured to: receive, from each of one or more premium UEs, one or more parameters indicating a quality of a location estimate of the premium UE; select at least one premium UE of the one or more premium UEs based on the quality of the location estimate of the at least one premium UE; and derive a location estimate of the reduced-capability UE based on the location estimate of the at least one premium UE.

In an aspect, a reduced-capability UE includes a memory; at least one transceiver; and at least one processor communicatively coupled to the memory and the at least one transceiver, the at least one processor configured to: cause the at least one transceiver to transmit, to at least one premium UE, a request to perform one or more positioning measurements of one or more downlink reference signals transmitted by one or more TRPs; receive, from the at least one premium UE, a measurement report comprising the one or more positioning measurements; and determine a location estimate of the reduced-capability UE based on the one or more positioning measurements in the measurement report.

In an aspect, a premium UE includes a memory; at least one transceiver; and at least one processor communicatively coupled to the memory and the at least one transceiver, the at least one processor configured to: receive, from a reduced-capability UE, one or more uplink reference signals; and perform one or more positioning measurements of the one or more uplink reference signals, wherein a location estimate of the reduced-capability UE is calculated based on the one or more positioning measurements.

In an aspect, a reduced-capability UE includes means for receiving, from each of one or more premium UEs, one or more parameters indicating a quality of a location estimate of the premium UE; means for selecting at least one premium UE of the one or more premium UEs based on the quality of the location estimate of the at least one premium UE; and means for deriving a location estimate of the reduced-capability UE based on the location estimate of the at least one premium UE.

In an aspect, a reduced-capability UE includes means for transmitting, to at least one premium UE, a request to perform one or more positioning measurements of one or more downlink reference signals transmitted by one or more TRPs; means for receiving, from the at least one premium UE, a measurement report comprising the one or more positioning measurements; and means for determining a location estimate of the reduced-capability UE based on the one or more positioning measurements in the measurement report.

In an aspect, a premium UE includes means for receiving, from a reduced-capability UE, one or more uplink reference signals; and means for performing one or more positioning measurements of the one or more uplink reference signals, wherein a location estimate of the reduced-capability UE is calculated based on the one or more positioning measurements.

In an aspect, a non-transitory computer-readable medium storing computer-executable instructions includes computer-executable instructions comprising: at least one instruction instructing a reduced-capability UE to receive, from each of one or more premium UEs, one or more parameters indicating a quality of a location estimate of the premium UE; at least one instruction instructing the reduced-capability UE to select at least one premium UE of the one or more premium UEs based on the quality of the location estimate of the at least one premium UE; and at least one instruction instructing the reduced-capability UE to derive a location estimate of the reduced-capability UE based on the location estimate of the at least one premium UE.

In an aspect, a non-transitory computer-readable medium storing computer-executable instructions includes computer-executable instructions comprising: at least one instruction instructing a reduced-capability UE to transmit, to at least one premium UE, a request to perform one or more positioning measurements of one or more downlink reference signals transmitted by one or more TRPs; at least one instruction instructing the reduced-capability UE to receive, from the at least one premium UE, a measurement report comprising the one or more positioning measurements; and at least one instruction instructing the reduced-capability UE to determine a location estimate of the reduced-capability UE based on the one or more positioning measurements in the measurement report.

In an aspect, a non-transitory computer-readable medium storing computer-executable instructions includes computer-executable instructions comprising: at least one instruction instructing a premium UE to receive, from a reduced-capability UE, one or more uplink reference signals; and at least one instruction instructing the premium UE to perform one or more positioning measurements of the one or more uplink reference signals, wherein a location estimate of the reduced-capability UE is calculated based on the one or more positioning measurements.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
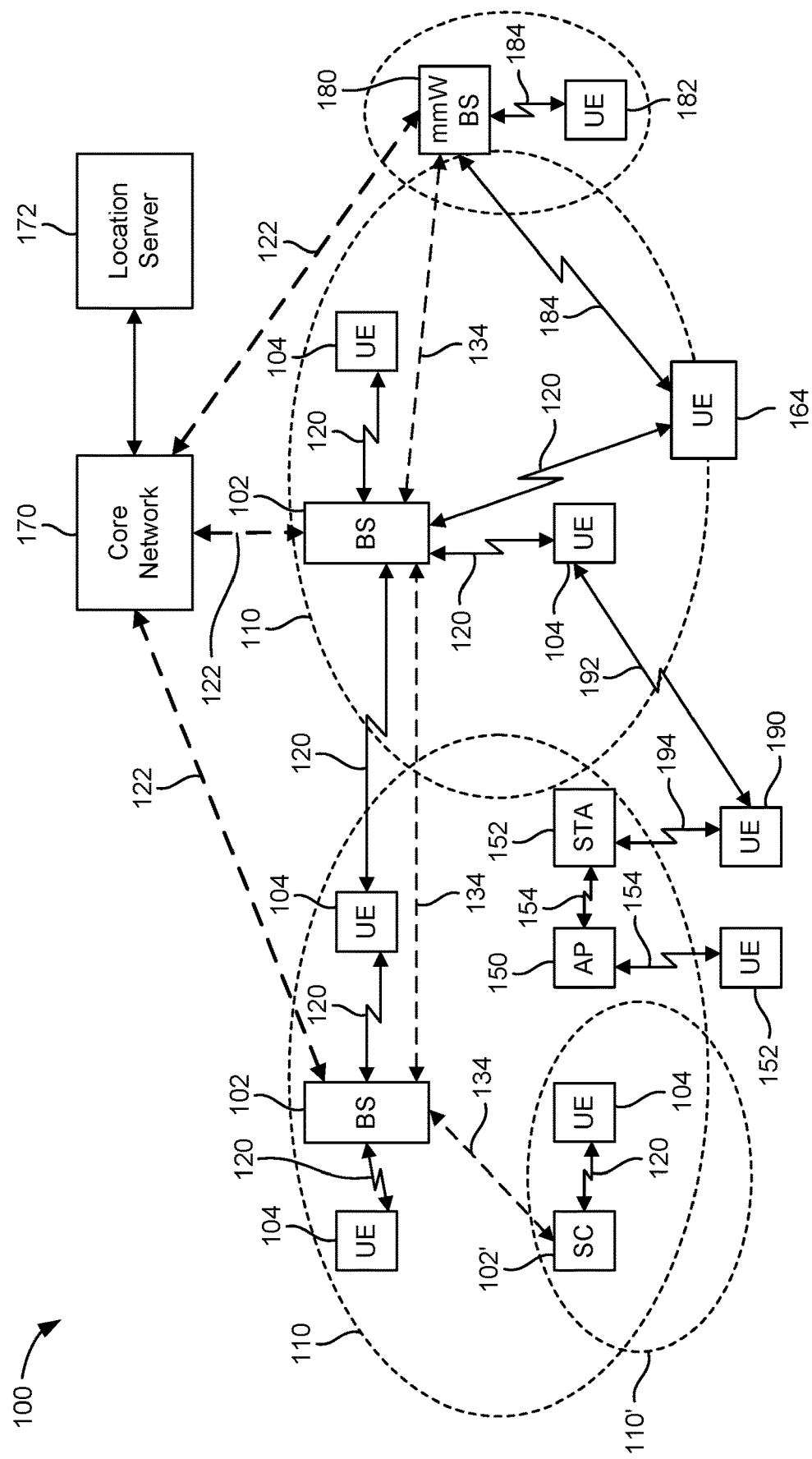
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
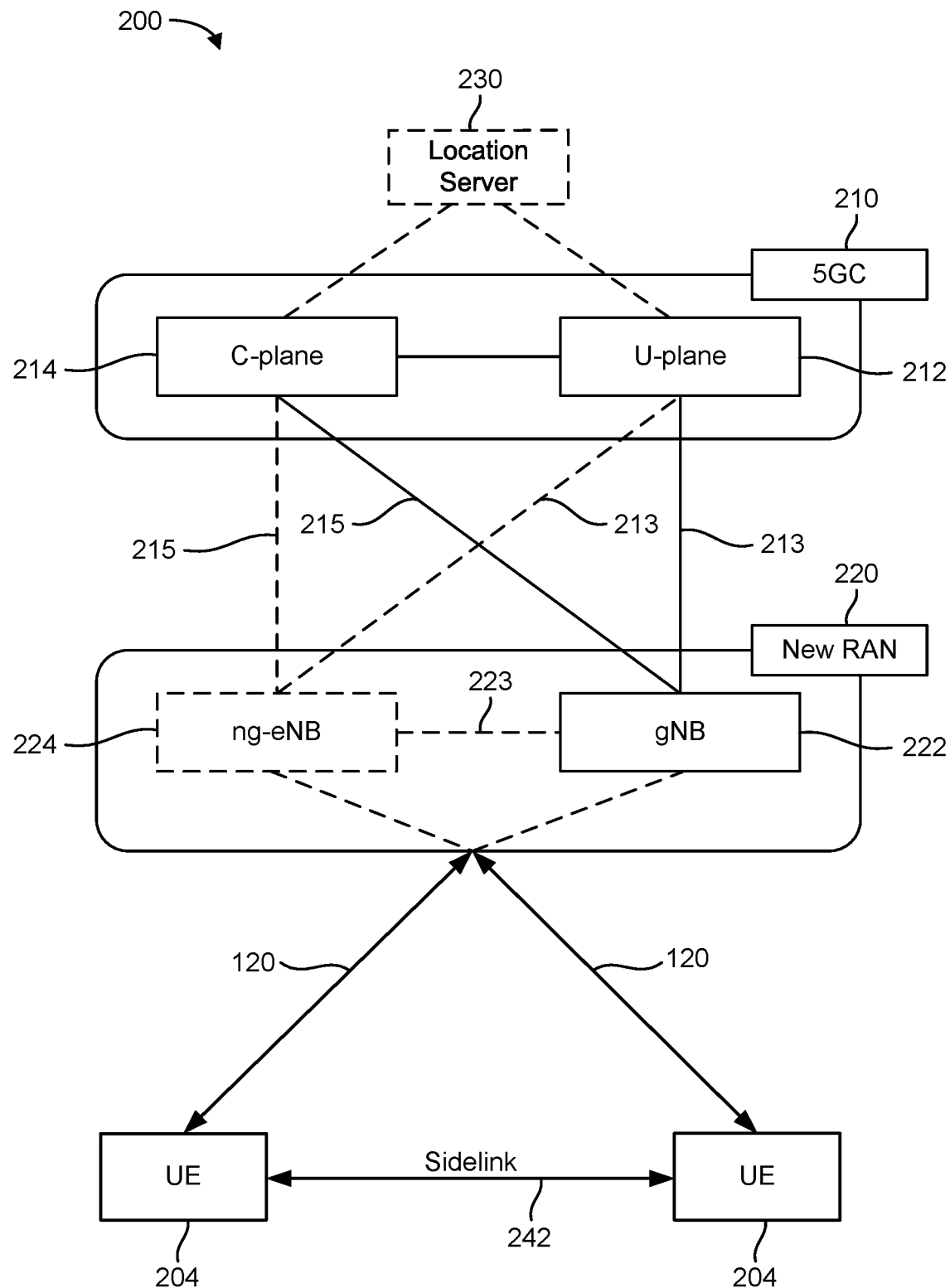
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either (or both) gNB 222 or ng-eNB 224 may communicate with UEs 204 (e.g., any of the UEs described herein, such as a premium UE and a low-tier UE). Note that although FIG. 2A only illustrates two UEs 204, as will be appreciated, there may be more than two UEs 204, and the two or more UEs 204 may form a sidelink communications group. In an aspect, two or more UEs 204 may communicate with each other over a wireless unicast sidelink 242, which may correspond to D2D P2P link 192 or 194 in FIG. 1. Alternatively, each pair of UEs 204 may communicate over a different sidelink 242 than other pairs of UEs 204.

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
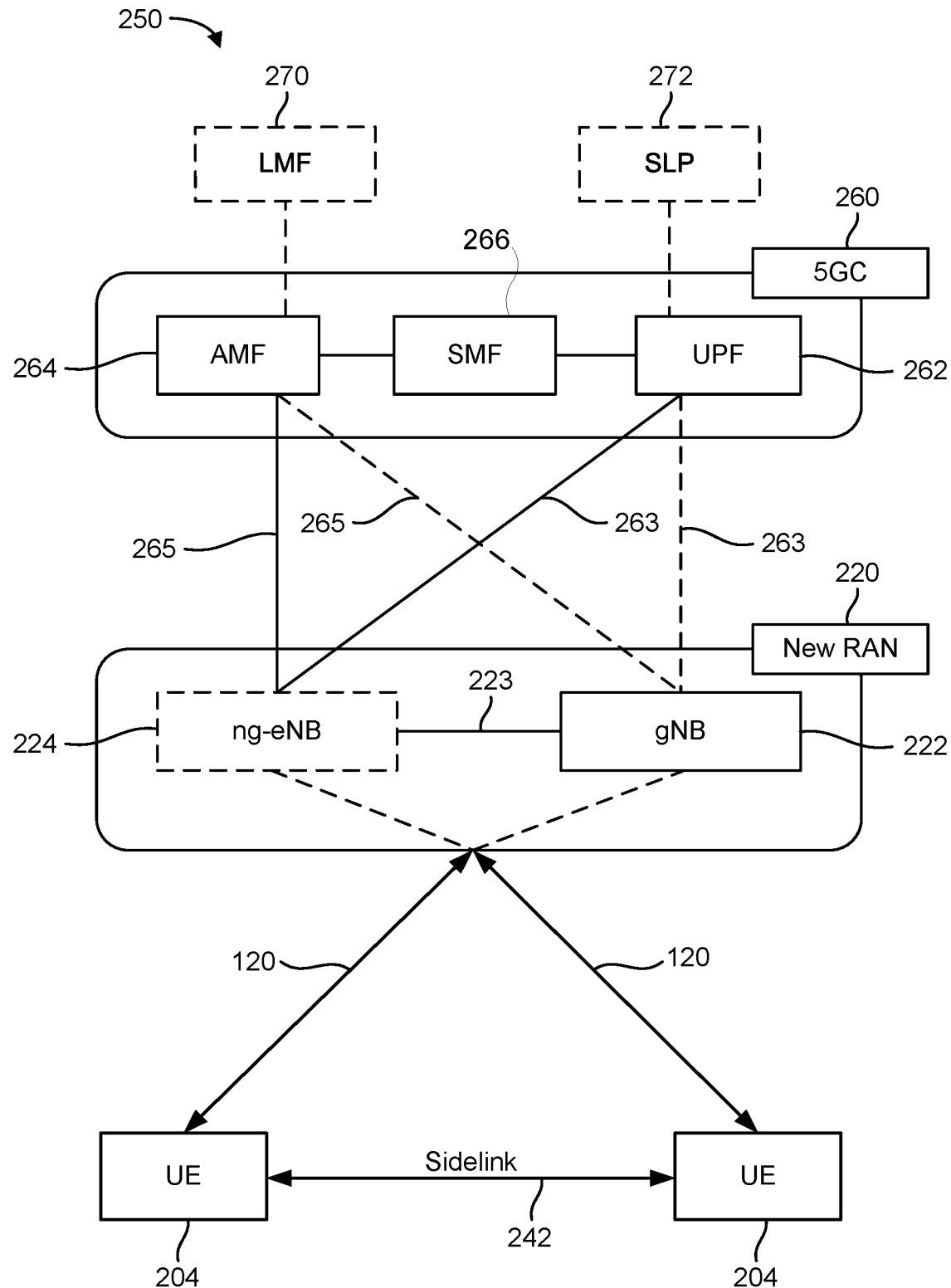

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. The base stations of the New RAN 220 communicate with the AMF 264 over the N2 interface and with the UPF 262 over the N3 interface. Either (or both) gNB 222 or ng-eNB 224 may communicate with UEs 204 (e.g., any of the UEs described herein, such as a premium UE and a low-tier UE). In an aspect, two or more UEs 204 may communicate with each other over a wireless unicast sidelink 242, which may correspond to D2D P2P link 192 or 194 in FIG. 1.

The functions of the AMF 264 include registration management, connection management, reachability management, mobility management, lawful interception, transport for session management (SM) messages between the UE 204 and a Session Management Function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 which acts as a location server 230, transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server such as a secure user plane location (SUPL) Location Platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270 but, whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g. using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
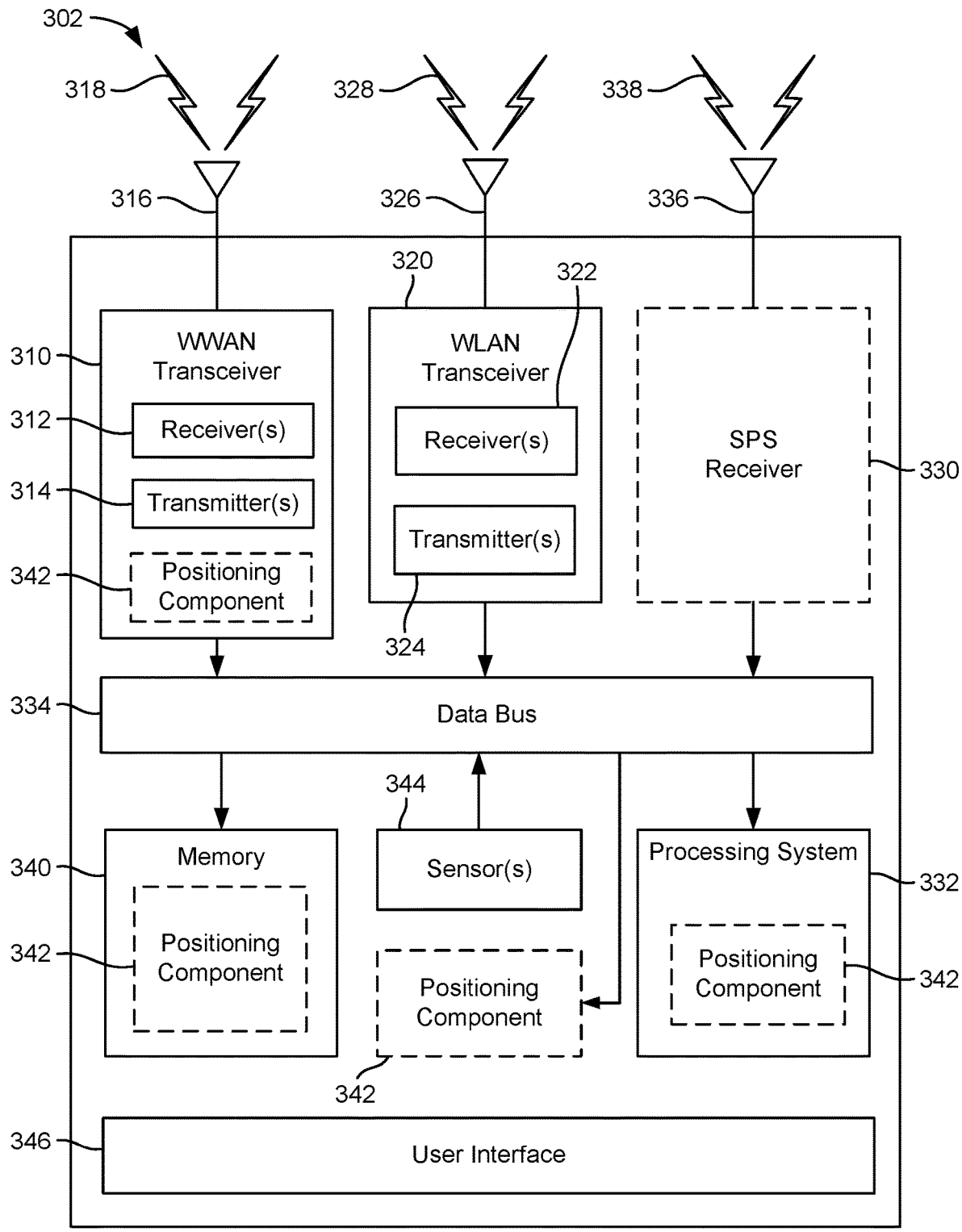
FIGS. 3A to 3C are simplified block diagrams of a user equipment (UE), base station, and network entity, according to various aspects of the disclosure.
Figure 3B:
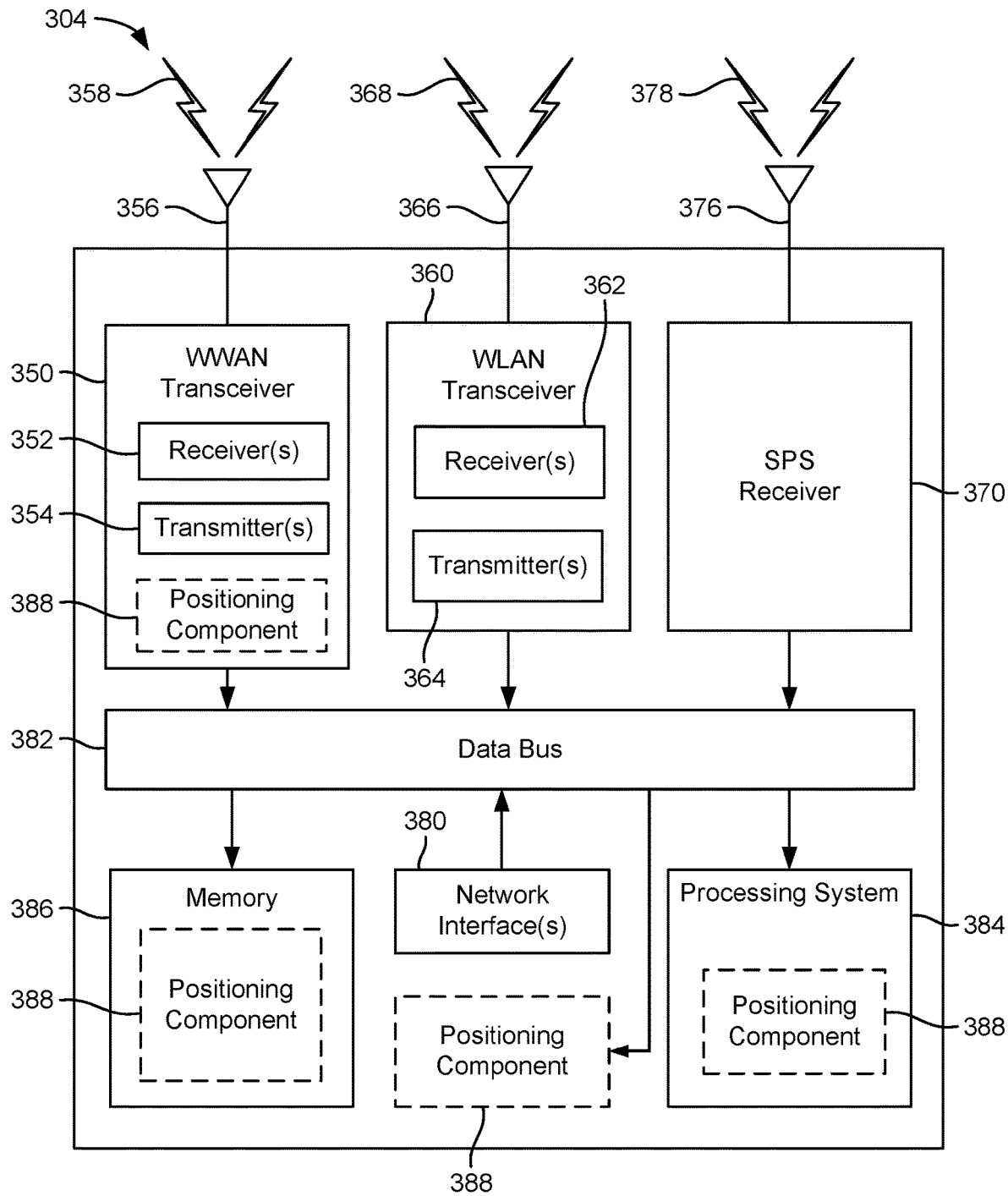
Figure 3C:
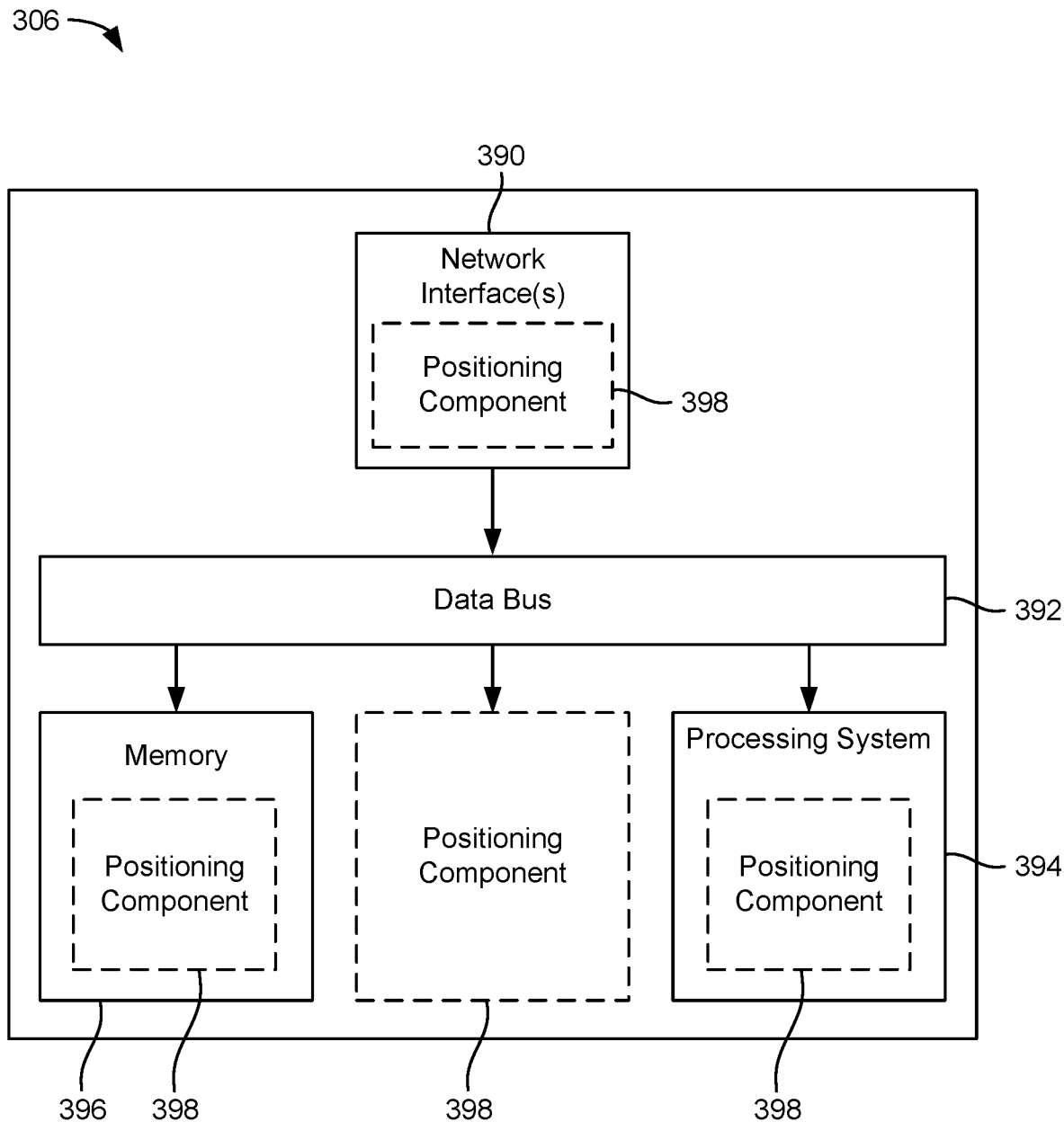

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Note that the UE 302 illustrated in FIG. 3A may represent a "low-tier" UE or a "premium" UE. As described further below, while low-tier and premium UEs may have the same types of components (e.g., both may have WWAN transceivers 310, processing systems 332, memory components 340, etc.), the components may have different degrees of functionality (e.g., increased or decreased performance, more or fewer capabilities, etc.) depending on whether the UE 302 corresponds to a low-tier UE or a premium UE.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
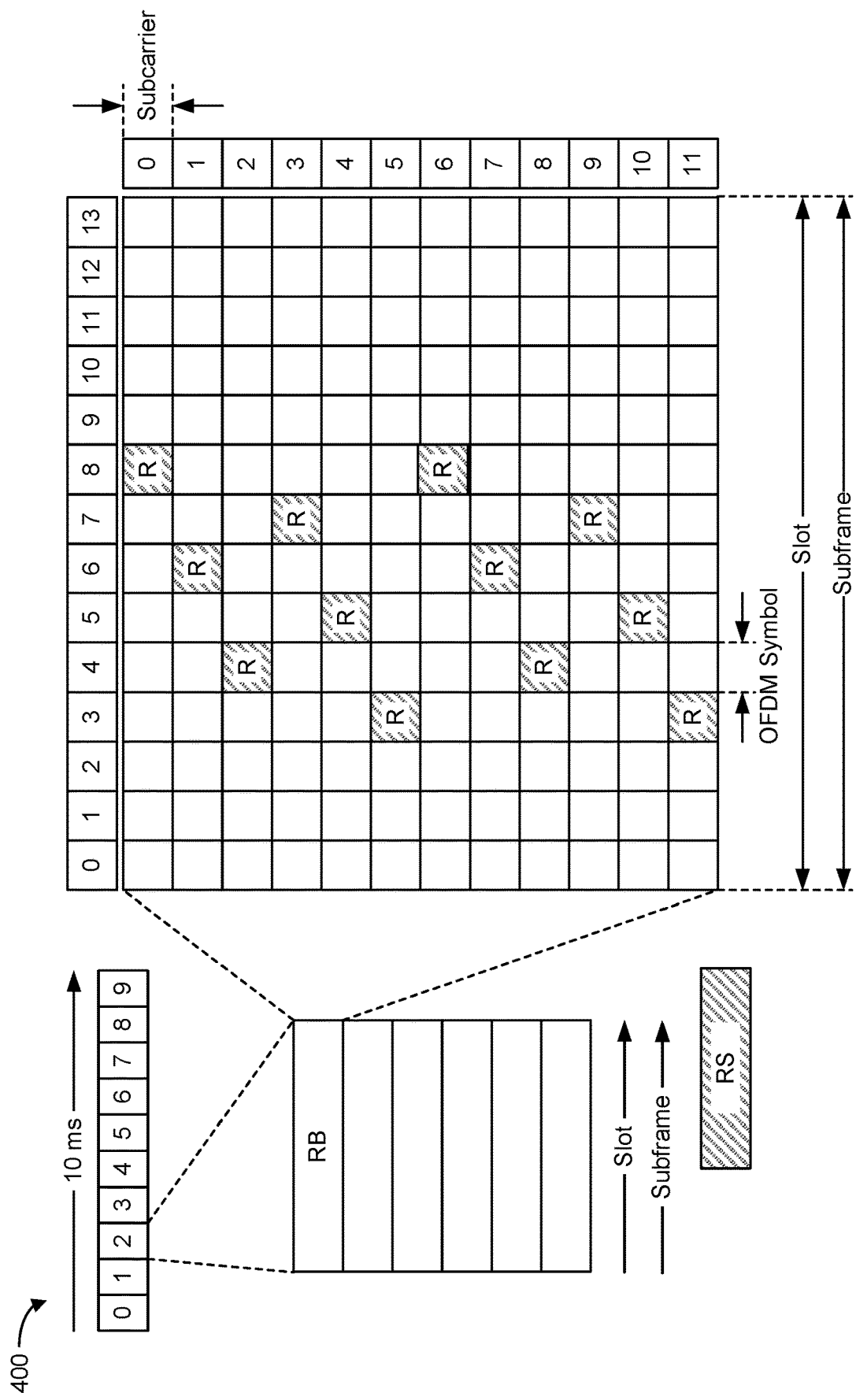
FIGS. 4A and 4B are diagrams illustrating example frame structures, according to various aspects of the disclosure.
Figure 4B:
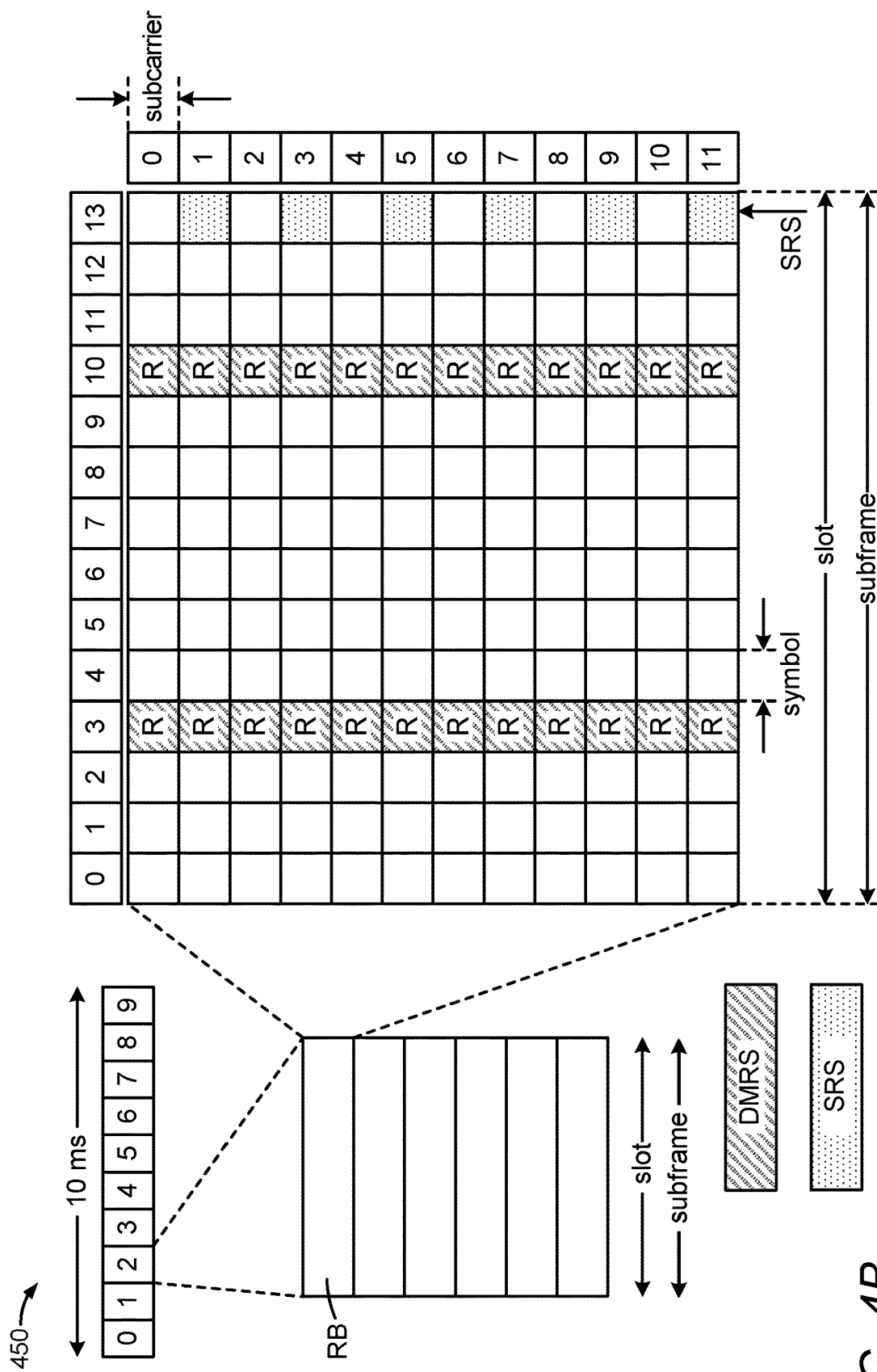

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 450 illustrating an example of an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Sot | Slots/ Subframe | Slots/ Frame | Slot Duration (ms) | Symbol Duration ($\mu$s) | Max. nominal system BW (MHz) with 4K FFT size |
| --- | --- | --- | --- | --- | --- | --- | --- |
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu}\cdot\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

As illustrated in FIG. 4B, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. The comb structure (also referred to as the "comb size") indicates the pattern of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 4B, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS also can be used as uplink positioning reference signals for uplink positioning procedures, such as uplink time-difference of arrival (UL-TDOA), multi-round-trip-time (multi-RTT), downlink angle-of-arrival (DL-AoA), etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters SpatialRelationInfo and PathLoss-Reference are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS as defined in LTE and 5G, TRS, PTRS, CRS, CSI-RS, DMRS, PSS, SSS, SSB, SRS, UL-PRS, etc. In addition, the terms "positioning reference signal" and "PRS" refer to downlink or uplink positioning reference signals, unless otherwise indicated. A downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

UEs may be classified as low-tier UEs (e.g., wearables, such as smart watches, glasses, rings, etc.) and premium UEs (e.g., smartphones, tablet computers, laptop computers, etc.). Low-tier UEs may alternatively be referred to as reduced-capability NR UEs, reduced-capability UEs, NR light UEs, light UEs, NR super light UEs, or super light UEs. Premium UEs may alternatively be referred to as full-capability UEs or simply UEs. Low-tier UEs generally have lower baseband processing capability, fewer antennas (e.g., one receiver antenna as baseline in FR1 or FR2, two receiver antennas optionally), lower operational bandwidth capabilities (e.g., 20 MHz for FR1 with no supplemental uplink or carrier aggregation, or 50 or 100 MHz for FR2), only half duplex frequency division duplex (HD-FDD) capability, smaller HARQ buffer, reduced physical downlink control channel (PDCCH) monitoring, restricted modulation (e.g., 64 QAM for downlink and 16 QAM for uplink), relaxed processing timeline requirements, and/or lower uplink transmission power compared to premium UEs. Different UE tiers can be differentiated by UE category and/or by UE capability. For example, certain types of UEs may be assigned a classification (e.g., by the original equipment manufacturer (OEM), the applicable wireless communications standards, or the like) of "low-tier" and other types of UEs may be assigned a classification of "premium." Certain tiers of UEs may also report their type (e.g., "low-tier" or "premium") to the network. Additionally, certain resources and/or channels may be dedicated to certain types of UEs.

As will be appreciated, the accuracy of low-tier UE positioning may be limited. For example, a low-tier UE may operate on a reduced bandwidth, such as 5 to 20 MHz for wearable devices and "relaxed" IoT devices (i.e., IoT devices with relaxed, or lower, capability parameters, such as lower throughput, relaxed delay requirements, lower energy consumption, etc.), which results in lower positioning accuracy. As another example, a low-tier UE's receive processing capability may be limited due to its lower cost RF/baseband. As such, the reliability of measurements and positioning computations would be reduced. In addition, such a low-tier UE may not be able to receive multiple PRS from multiple TRPs, further reducing positioning accuracy. As yet another example, the transmit power of a low-tier UE may be reduced, meaning there would be a lower quality of uplink measurements for low-tier UE positioning.

Premium UEs generally have a larger form factor and are costlier than low-tier UEs, and have more features and capabilities than low-tier UEs. For example, with respect to positioning, a premium UE may operate on the full PRS bandwidth, such as 100 MHz, and measure PRS from more TRPs than low-tier UEs, both of which result in higher positioning accuracy. As another example, a premium UE's receive processing capability may be higher (e.g., faster) due to its higher-capability RF/baseband. In addition, the transmit power of a premium UE may be higher than that of a low-tier UE. As such, the reliability of measurements and positioning computations would be increased.

Low-tier UEs, such as wearables, are often operated around premium UEs, such as smartphones and tablets. As such, the present disclosure provides techniques for a low-tier UE to leverage the presence of one or more premium UEs to enhance its positioning accuracy.

Figure 5:
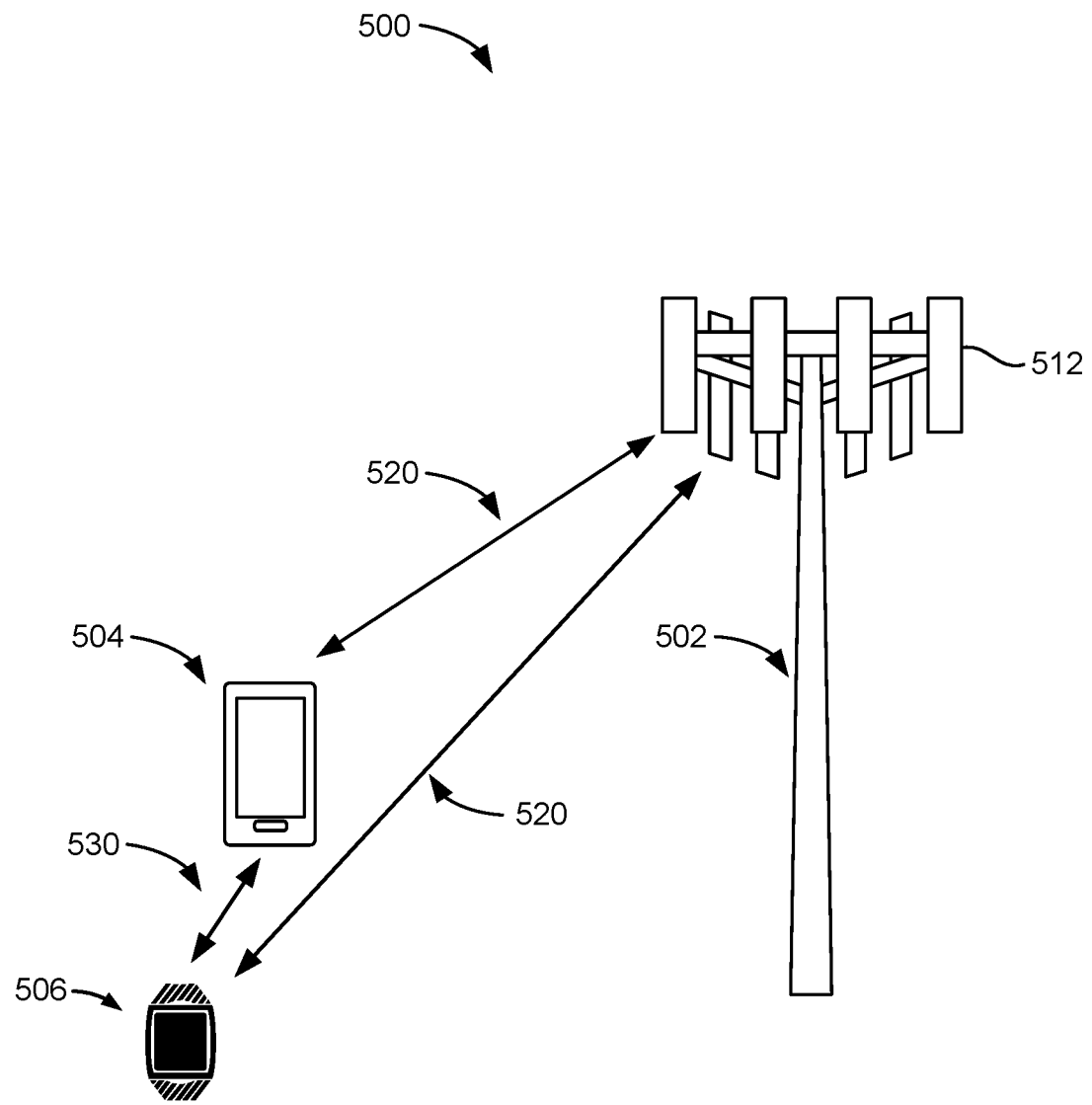
FIG. 5 is a diagram of an example base station, premium UE, and low-tier UE, according to aspects of the disclosure.

FIG. 5 is a diagram 500 of an example base station 502 (e.g., any of the base stations described herein), a premium UE 504, and a low-tier UE 506, according to aspects of the disclosure. The base station 502 is illustrated as having multiple antennas 512, and a panel of such antennas 512 (e.g., all antennas 512 on a particular side of the base station 502) may correspond to a cell and/or TRP supported by the base station 502. In the example of FIG. 5, the premium UE 504 is illustrated as a smartphone and the low-tier UE 506 is illustrated as a smartwatch. However, as will be appreciated, these are merely examples and the disclosure is not so limited.

As further illustrated in FIG. 5, the premium UE 504 is in communication with the base station 502 over a wireless communication link 520 (e.g., communication link 120), and the low-tier UE 506 is in communication with the premium UE 504 over a wireless sidelink 530 (e.g., D2D P2P link 192, 194). The wireless sidelink 530 may be an NR sidelink, and may support a physical sidelink control channel (PSCCH) and/or a physical sidelink control channel (PSSCH) between the premium UE 504 and the low-tier UE 506. In addition, like the premium UE 504, the low-tier UE 506 may also be able to communicate with the base station 502 over a wireless communication link 520 (e.g., communication link 120). Note that while FIG. 5 illustrates the low-tier UE 506 connected to a single premium UE 504, the low-tier UE 506 may be connected to multiple premium UEs 504.

As a first solution for a low-tier UE 506 to leverage the presence of one or more premium UEs 504 to enhance its positioning accuracy, the low-tier UE 506 may use the location of the premium UE(s) 504 to derive its own location. When attempting to perform a positioning procedure, the low-tier UE 506 may first search for premium UEs 504 around it (i.e., within wireless communication range). In some cases, the low-tier UE 506 may already be connected to a premium UE 504 through a side link (e.g., wireless sidelink 530). In other cases, the low-tier UE 506 may need to perform a scan to discover premium UE(s) 504 around it. In still other cases, the network (e.g., location server 230, LMF 270, base station 502) may notify the low-tier UE 506 whether or not there are any premium UEs 504 around it, and if there are, provide it with a way to connect with them.

Once connected to the one or more premium UEs 504, the low-tier UE 506 can select which premium UE(s)' 504 location(s) to use to derive its own location. In an aspect, the quality of the premium UE(s)' 504 location estimate(s) could be provided to the low-tier UE 506 by the premium UE(s) 504 (e.g., over wireless sidelink 530) and/or by the network (e.g., base station 502 and/or the location server).

The quality of the location estimate(s) could help with the selection of the premium UE(s) 504 for the association between the low-tier UE 506 and the premium UE(s) 504.

Once the premium UE(s) 504 have been selected, the low-tier UE 506 can use the location estimate(s) of the associated premium UE(s) 504 to derive its own location estimate. As a first option, the low-tier UE 506 can simply adopt the location of a connected premium UE 504 as its own location. In that case, the selected premium UE 504 may transmit its location estimate to the low-tier UE 506 (e.g., over wireless sidelink 530), which may then transmit the location estimate to the network (e.g., base station 502, over wireless communication link 520, or the location server) or other entity requesting the location of the low-tier UE 506 (e.g., an application running on the low-tier UE 506). Alternatively, the selected premium UE 504 can notify the network (e.g., over wireless communication link 520) that the low-tier UE's 506 location is the same as its own location (e.g., where the network is requesting the low-tier UE's 506 location).

As a second option, the low-tier UE 506 can use the location estimates of multiple premium UEs 504 around it to derive its own location. In that case, the premium UEs 504 can send their locations to the low-tier UE 506 (e.g., over wireless sidelinks 530), and the low-tier UE 506 may report the average of the locations of the premium UEs 504 (e.g., to the base station 502 over wireless communication link 520) as its location. Alternatively, the network may derive the location of the low-tier UE 506 based on the locations of the associated premium UEs 504. In that case, the selected premium UEs 504 may report their locations to the network, rather than the low-tier UE 506 (although it still could).

As a second solution for a low-tier UE 506 to leverage the presence of one or more premium UEs 504 to enhance its positioning accuracy, the low-tier UE 506 can estimate its location based on positioning measurements performed by premium UE(s) 504. At a high level, a low-tier UE 506 can leverage premium UE(s) 504 to conduct wideband downlink measurements from one or more TRPs (e.g., one or more antenna panels of base station 502 and/or other base stations). As noted above, low-tier UEs 506 generally operate in a narrower bandwidth than premium UEs 504, and as such, suffer from reduced positioning accuracy. In contrast, premium UEs 504 can operate in a wider bandwidth, and therefore, are capable of more accurate positioning measurements than low-tier UEs 506.

Accordingly, a low-tier UE 504 may request that the premium UE(s) 504 perform RSTD measurements (for DL-TDOA or OTDOA positioning techniques), RSRP measurements (for DL-AoD positioning techniques), UE Rx-Tx measurements (for RTT positioning techniques), and/or any other positioning measurement(s) that the premium UE(s) 504 are able to perform/acquire. The premium UE(s) 504 may perform these measurements as described above, and then transmit them to the low-tier UE 506 (e.g., over wireless sidelink 530).

In an aspect, the low-tier UE 506 can notify the premium UE(s) 504 on how frequently the requested positioning measurements are needed. For example, the low-tier UE 506 may have one or more sensors (e.g., accelerometer, gyroscope) to detect its mobility state and/or pattern, which may indicate how frequently the positioning information needs to be updated. For example, where the low-tier UE 506 is a smartwatch, it may detect that the user is running, in which case, it would need more frequent positioning measurements.

In an aspect, the low-tier UE 506 may also signal the premium UE(s) 504 to stop reporting the requested positioning measurements. For example, the low-tier UE 506 may request a one-time measurement session (i.e., one set of measurements), or that the premium UE(s) 504 perform the requested positioning measurements for some period of time, or that the premium UE(s) 504 perform the requested positioning measurements until asked to stop. For example, where the low-tier UE 506 stays in the same location (as detected by sensors of the low-tier UE 506 or from previous location estimates) for a sufficiently long period of time, it can request the premium UE(s) 506 to stop sending measurement reports.

In an aspect, the low-tier UE 506 may request measurements of specific PRS (e.g., specific PRS identifiers (IDs)) of specific TRPs. It may also request that specific measurements be performed at specific occasions in time. For example, the low-tier UE 506 may request that a premium UE 504 calculate an RSTD derived from PRSID "5" on frame "100."

The premium UE(s) 504 may reply back to the low-tier UE 506 with the requested measurements, and also a timestamp indicating the timer period during which the measurements are valid. These measurement reports may also include information about the measured TRP(s) (e.g., location(s) of the TRP(s)). The premium UE(s) 504 may also send the quality of the measurements to the low-tier UE 506 in the measurement reports. The premium UE(s) 504 may also send information about the measured PRS (e.g., scrambling ID, bandwidth, number of ports, number of averaging across occasions) that were used to derive the reported measurements. With the location of the measured TRP(s) and the quality of the measurements, the low-tier UE 506 can fuse the measurements in a positioning component (e.g., positioning component 342) to calculate a location estimate for itself (referred to as UE-based positioning).

In an aspect, the reported measurements may be included in a higher layer signaling package, such as an LPP-type protocol message, transmitted between the low-tier UE 506 and the premium UE(s) 504 over wireless sidelink(s) 530.

In an aspect, rather than the low-tier UE 506 performing the location estimate, the low-tier UE 506 could request the network (e.g., location server 230, LMF 270, SLP 272, or other network positioning entity) to perform the location estimate based on the measurements reported by the associated premium UE(s) 504. The low-tier UE 506 may send the relevant measurements to the network itself (e.g., over wireless communication link 520), or, to save overhead, request that the premium UE(s) 504 send the measurements directly to the network (in which case, the premium UE(s) 504 need not, but may still, also send the measurements to the low-tier UE 506).

The network may then calculate an estimate of the low-tier UE's 506 location based on the measurements taken by the premium UE(s) 506. The network can fuse the positioning measurements reported by multiple premium UEs 506, which may increase the accuracy of the location estimate over using the measurements from a single premium UE 504. For example, if one of two associated premium UEs 504 is blocked without a line-of-sight (LOS) path between the base station 502 and the premium UE 504, but the other premium UE 504 has a LOS path, estimating a location of the low-tier UE 506 based on the measurement reports from both premium UE 504 may provide a more accurate and robust location estimate. For example, the network can give more weight to the measurements from the LOS premium UE 504.

In an aspect, the low-tier UE 506 may also perform its own positioning measurements of downlink reference signals received from nearby TRPs (e.g., the same TRPs as measured by the premium UE(s) 504). In that case, the positioning entity (the low-tier UE 506 or the network) may fuse the measurements from the low-tier UE 506 with the measurements from the premium UE(s) 504 in order to more accurately estimate the location of the low-tier UE 506.

As a third solution for a low-tier UE 506 to leverage the presence of one or more premium UEs 504 to enhance its positioning accuracy, the premium UE(s) 504 can measure uplink signals transmitted by the low-tier UE 506. In an aspect, the low-tier UE 506 may treat the associated premium UE(s) 506 as "gNB(s)" for the purpose of positioning. The low-tier UE 506 can then save power by transmitting positioning reference signals (e.g., UL-PRS, SRS, etc.) to the premium UE(s) 504 over the wireless sidelink 530 instead of transmitting them to the base station(s) 502 over the wireless communication link 520. Because of the shorter range to the premium UE(s) 704 than to the base station(s) 502, such uplink transmissions would use lower transmit power on the part of the low-tier UE 506.

The premium UE(s) 504 can then estimate the relative location of the low-tier UE 506 based on measurements of the received uplink signals from the low-tier UE 506. For example, a premium UE 504 may use the RTT between itself and the low-tier UE 506 and the AoA of the uplink reference signals from the low-tier 506 to estimate the location of the low-tier UE 506. The premium UE 504 may then report the location estimate to the low-tier UE 506 and/or the network. If there are multiple premium UEs 504, the positioning entity (i.e., the low-tier UE 506 or the network) can fuse (e.g., average) the location estimates from the different premium UEs 504 to determine a more accurate location estimate of the low-tier UE 506.

Alternatively, the premium UE(s) 504 may simply report the measurements of the uplink reference signals transmitted by the low-tier UE 506 to the network (or the low-tier UE 506, which could then forward them to the network depending on which entity is performing the positioning). The network (or the low-tier UE 506) can then estimate the location of the low-tier UE 506 based on the measurements from the premium UE(s) 504.

If the network needs the location of the low-tier UE 506 and is the entity performing the location estimate, then the network can further process the location estimate as needed. If the low-tier UE 506 needs the estimate of its location and is not the entity calculating the location estimate, then the network can send the calculated location estimate to the low-tier UE 506 either over the wireless communication link 520 or via one of the premium UEs 504.

Note that any information received at the low-tier UE 506 from the premium UE(s) 504 can be forwarded to the network (e.g., location server 230, LMF 270, SLP 272, base station 502, or other network-based positioning entity) over the wireless communication link 520. Similarly, any information received at the low-tier UE 506 from the network can be forwarded to the premium UE(s) 504 over the wireless sidelink 530. Further, any information generated or received at the premium UE(s) 504 can be forwarded to the low-tier UE 506 over the wireless sidelink 530 and/or to the network over the wireless communication link 520. The network can communicate with the low-tier UE 506 either directly over the wireless communication link 520, or via the premium UE(s) 504.

Figure 6:
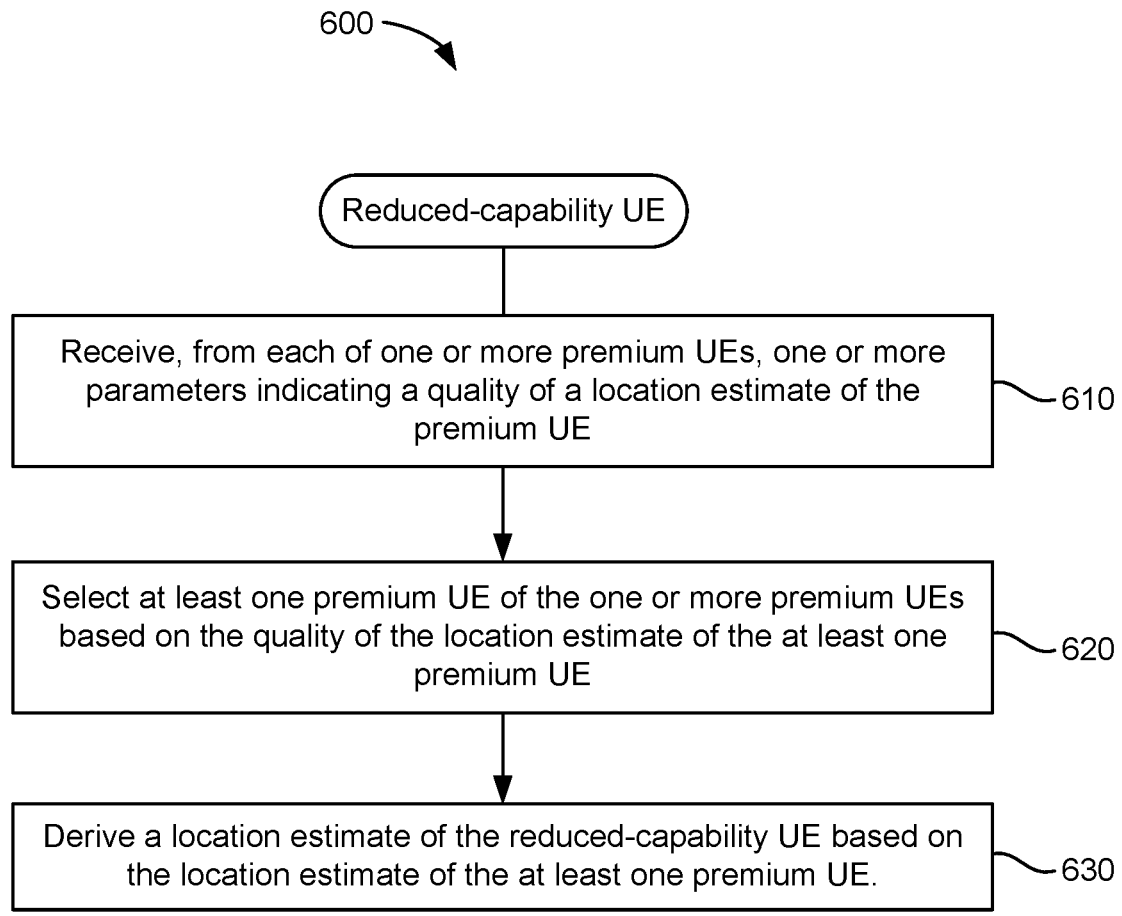
FIGS. 6 to 8 illustrate example methods of wireless communication, according to aspects of the disclosure.

FIG. 6 illustrates an example method 600 of wireless positioning, according to aspects of the disclosure. The method 600 may be performed by a low-tier UE (e.g., low-tier UE 506).

At 610, the low-tier UE receives, from each of one or more premium UEs (e.g., premium UE 504), one or more parameters indicating a quality of a location estimate of the premium UE. In an aspect, operation 610 may be performed by WWAN transceiver 310, processing system 332, memory component 340, and/or positioning component 342, any or all of which may be considered means for performing this operation.

At 620, the lo-tier UE selects at least one premium UE of the one or more premium UEs based on the quality of the location estimate of the at least one premium UE. In an aspect, operation 620 may be performed by WWAN transceiver 310, processing system 332, memory component 340, and/or positioning component 342, any or all of which may be considered means for performing this operation.

At 630, the low-tier derives a location estimate of the low-tier UE based on the location estimate of the at least one premium UE. In an aspect, operation 630 may be performed by WWAN transceiver 310, processing system 332, memory component 340, and/or positioning component 342, any or all of which may be considered means for performing this operation.

Figure 7:
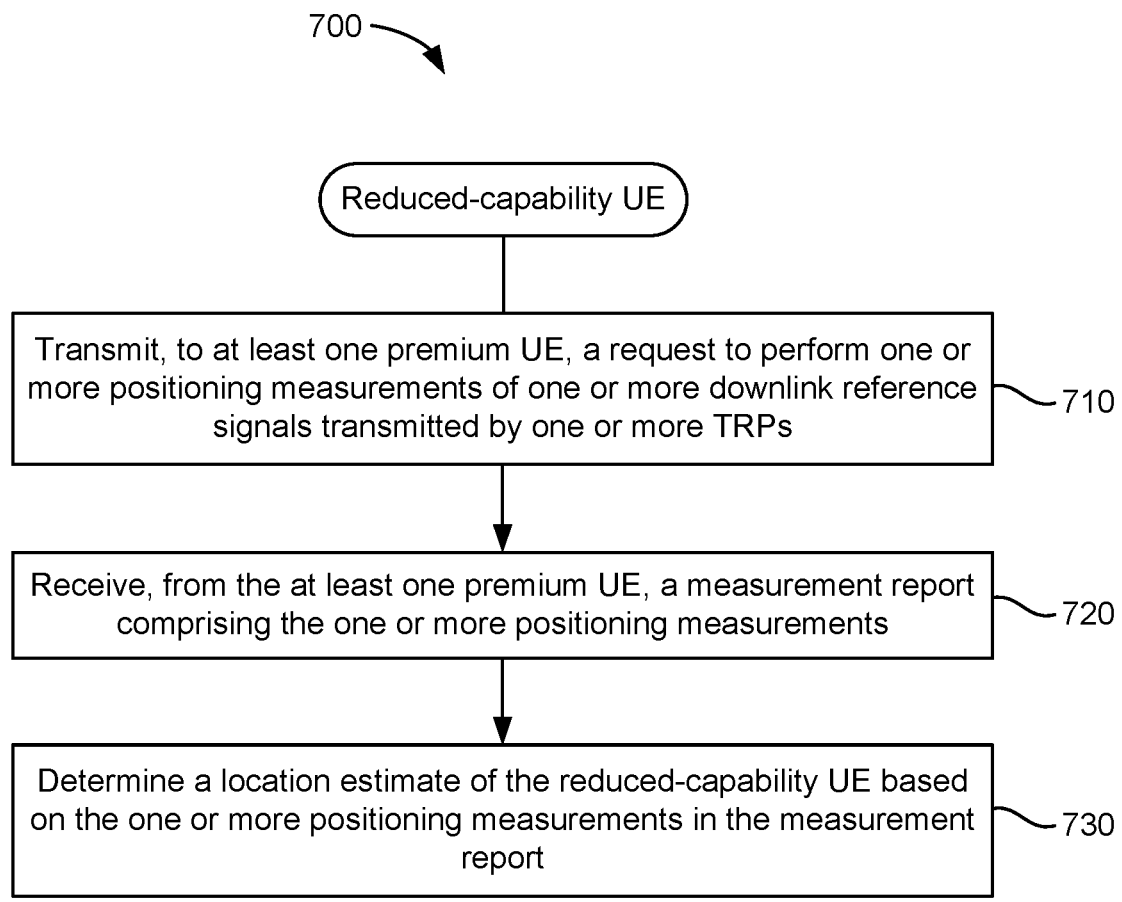

FIG. 7 illustrates an example method 700 of wireless positioning, according to aspects of the disclosure. The method 700 may be performed by a low-tier UE (e.g., low-tier UE 506).

At 710, the low-tier UE transmits, to at least one premium UE (e.g., premium UE 504), a request to perform one or more positioning measurements of one or more downlink reference signals transmitted by one or more TRPs (one or more antenna panels of base station 502). In an aspect, operation 710 may be performed by WWAN transceiver 310, processing system 332, memory component 340, and/or positioning component 342, any or all of which may be considered means for performing this operation.

At 720, the low-tier UE receives, from the at least one premium UE, a measurement report comprising the one or more positioning measurements. In an aspect, operation 720 may be performed by WWAN transceiver 310, processing system 332, memory component 340, and/or positioning component 342, any or all of which may be considered means for performing this operation.

At 730, the low-tier UE determines a location estimate of the low-tier UE based on the one or more positioning measurements in the measurement report. In an aspect, operation 730 may be performed by WWAN transceiver 310, processing system 332, memory component 340, and/or positioning component 342, any or all of which may be considered means for performing this operation.

Figure 8:
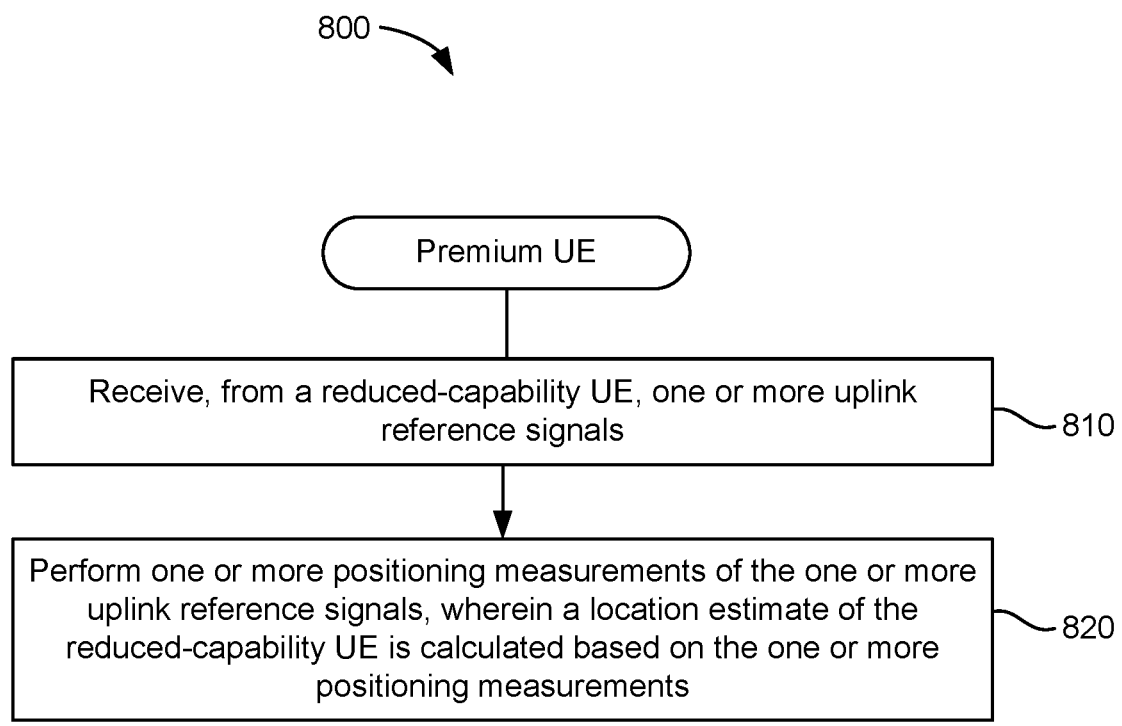

FIG. 8 illustrates an example method 800 of wireless positioning, according to aspects of the disclosure. The method 800 may be performed by a premium UE (e.g., premium UE 504).

At 810, the premium UE receives, from a low-tier UE (e.g., low-tier UE 506), one or more uplink reference signals. In an aspect, operation 810 may be performed by WWAN transceiver 310, processing system 332, memory component 340, and/or positioning component 342, any or all of which may be considered means for performing this operation.

At 820, the premium UE performs one or more positioning measurements of the one or more uplink reference signals. In an aspect, a location estimate of the low-tier UE is calculated based on the one or more positioning measurements. In an aspect, operation 820 may be performed by WWAN transceiver 310, processing system 332, memory component 340, and/or positioning component 342, any or all of which may be considered means for performing this operation.

As will be appreciated, there are various technical advantages of the techniques described herein, and in particular methods 600, 700, and 800. For example, the techniques disclosed herein enable higher positioning accuracy when determining the location of a low-tier UE, such as low-tier UE 506. In addition, the techniques disclosed herein may reduce power consumption for a low-tier UE, particularly when performing positioning operations.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a reduced-capability user equipment (UE), comprising:
   receiving, from each of one or more premium UEs, one or more parameters indicating a quality of a location estimate of the premium UE, wherein the reduced-capability UE comprises a UE having fewer antennas, lower bandwidth capabilities, lower processing capabilities, lower transmission power, or any combination thereof, than the premium UE;
   selecting at least one premium UE of the one or more premium UEs based on the quality of the location estimate of the at least one premium UE; and
   deriving a location estimate of the reduced-capability UE based on the location estimate of the at least one premium UE, wherein a frequency of deriving the location estimate of the reduced-capability UE is based on a mobility state of the reduced-capability UE.

2. The method of claim 1, further comprising:
   scanning for premium UEs within communication range of the reduced-capability UE; and establishing a sidelink connection to each of the one or more premium UEs based on the one or more premium UEs being within communication range of the reduced-capability UE.

3. The method of claim 2, wherein the reduced-capability UE receives the one or more parameters from each of the one or more premium UEs over the respective sidelink connection.

4. The method of claim 2, wherein the reduced-capability UE scans for the premium UEs in response to reception of a positioning request from a positioning entity.

5. The method of claim 4, wherein the positioning entity comprises a location server or an application running on the reduced-capability UE.

6. The method of claim 2, wherein the reduced-capability UE scans for the premium UEs in response to a notification from a network entity that the one or more premium UEs are within communication range of the reduced-capability UE.

7. The method of claim 1, wherein the deriving comprises:
adopting the location estimate of the at least one premium UE as the location estimate of the reduced-capability UE.

8. The method of claim 7, further comprising:
transmitting, to the at least one premium UE, a request for the at least one premium UE to transmit the location estimate of the at least one premium UE to a location server.

9. The method of claim 7, further comprising:
receiving, from the at least one premium UE, the location estimate of the at least one premium UE; and
transmitting the location estimate of the at least one premium UE to a location server.

10. The method of claim 1, wherein:
the at least one premium UE comprises a plurality of premium UEs, and
the deriving comprises:
receiving a location estimate from each of the plurality of premium UEs; and
averaging the location estimates of the plurality of premium UEs to generate the location estimate of the reduced-capability UE.

11. A method of wireless positioning performed by a reduced-capability user equipment (UE), comprising:
transmitting, to at least one premium UE, a request to perform one or more positioning measurements of one or more downlink reference signals transmitted by one or more transmission-reception points (TRPs), wherein the reduced-capability UE comprises a UE having fewer antennas, lower bandwidth capabilities, lower processing capabilities, lower transmission power, or any combination thereof, than the at least one premium UE, and wherein a frequency of performing the one or more positioning measurements is based on a mobility state of the reduced-capability UE;
receiving, from the at least one premium UE, a measurement report comprising the one or more positioning measurements; and
determining a location estimate of the reduced-capability UE based on the one or more positioning measurements in the measurement report.

12. The method of claim 11, further comprising:
transmitting, to the at least one premium UE, an indication of how frequently to perform the one or more positioning measurements.

13. The method of claim 11, further comprising:
transmitting, to the at least one premium UE, an indication to stop performing the one or more positioning measurements.

14. The method of claim 11, wherein the measurement report further comprises identifiers of the one or more TRPs, a timestamp during which the one or more positioning measurements are valid, one or more parameters indicating a quality of the one or more positioning measurements, information about the one or more downlink reference signals that was used to perform the one or more positioning measurements, or any combination thereof.

15. The method of claim 11, wherein the one or more positioning measurements comprise one or more reference signal time difference (RSTD) measurements, one or more reference signal received power (RSRP) measurements, one or more UE reception-to-transmission (Rx-Tx) measurements, a downlink angle of departure (DL-AoD), or any combination thereof.

16. The method of claim 11, wherein the determining comprises:
calculating, by a positioning component of the reduced-capability UE, the location estimate of the reduced-capability UE.

17. The method of claim 11, wherein the determining comprises:
transmitting, to a location server, the measurement report to enable the location server to calculate the location estimate of the reduced-capability UE.

18. The method of claim 11, further comprising:
scanning for premium UEs within communication range of the reduced-capability UE; and
establishing a sidelink connection to the at least one premium UE based on the at least one premium UE being within communication range of the reduced-capability UE.

19. The method of claim 18, wherein the reduced-capability UE receives the measurement report from the at least one premium UE over the sidelink connection.

20. A method of wireless positioning performed by a premium user equipment (UE), comprising:
receiving, from a reduced-capability UE, one or more uplink reference signals, wherein the reduced-capability UE comprises a UE having fewer antennas, lower bandwidth capabilities, lower processing capabilities, lower transmission power, or any combination thereof, than the premium UE; and
performing one or more positioning measurements of the one or more uplink reference signals, wherein a location estimate of the reduced-capability UE is calculated based on the one or more positioning measurements, and wherein a frequency of performing the one or more positioning measurements is based on a mobility state of the reduced-capability UE.

21. The method of claim 20, further comprising:
receiving, from the reduced-capability UE, a request to establish a sidelink connection between the premium UE and the reduced-capability UE; and
establishing the sidelink connection with the reduced-capability UE.

22. The method of claim 21, wherein the premium UE receives the one or more uplink reference signals over the sidelink connection.

23. The method of claim 22, wherein the one or more uplink reference signals transmitted over the sidelink connection for reception at the premium UE have a lower transmit power than uplink reference signals transmitted over a communication link between the premium UE and a macro cell base station.

24. The method of claim 21, wherein the sidelink connection supports a physical sidelink control channel (PSCCH) and/or a physical sidelink control channel (PSSCH).

25. The method of claim 20, further comprising:
calculating the location estimate of the reduced-capability UE based on the one or more positioning measurements; and
transmitting the location estimate to a location server.

26. The method of claim 20, further comprising:
calculating the location estimate of the reduced-capability UE based on the one or more positioning measurements; and
transmitting the location estimate to the reduced-capability UE.

27. The method of claim 20, wherein the one or more uplink reference signals comprise one or more sounding reference signals (SRS), one or more uplink positioning reference signals (UL-PRS), or any combination thereof.

28. The method of claim 20, wherein the one or more positioning measurements comprise one or more reference signal received power (RSRP) measurements, one or more UE reception-to-transmission (Rx-Tx) measurements, one or more angle-of-arrival (AoA) measurements, one or more reference signal time difference (RSTD) measurements between pairs of reduced-capability UEs for an uplink time-difference of arrival (UTDOA) positioning procedure, or any combination thereof.

29. The method of claim 20, further comprising:
transmitting the one or more positioning measurements to a location server, wherein the location server calculates the location estimate of the reduced-capability UE based on the one or more positioning measurements.

30. A reduced-capability user equipment (UE), comprising:
a memory;
at least one transceiver; and
at least one processor communicatively coupled to the memory and the at least one transceiver, the at least one processor configured to:
receive, from each of one or more premium UEs, one or more parameters indicating a quality of a location estimate of the premium UE, wherein the reduced-capability UE comprises a UE having fewer antennas, lower bandwidth capabilities, lower processing capabilities, lower transmission power, or any combination thereof, than the premium UE;
select at least one premium UE of the one or more premium UEs based on the quality of the location estimate of the at least one premium UE; and
derive a location estimate of the reduced-capability UE based on the location estimate of the at least one premium UE, wherein a frequency of deriving the location estimate of the reduced-capability UE is based on a mobility state of the reduced-capability UE.

31. The reduced-capability UE of claim 30, wherein the at least one processor is further configured to:
cause the at least one transceiver to scan for premium UEs within communication range of the reduced-capability UE; and
cause the at least one transceiver to establish a sidelink connection to each of the one or more premium UEs based on the one or more premium UEs being within communication range of the reduced-capability UE.

32. The reduced-capability UE of claim 31, wherein the at least one processor receives the one or more parameters from each of the one or more premium UEs over the respective sidelink connection.

33. The reduced-capability UE of claim 31, wherein the at least one processor causes the at least one transceiver to scan for the premium UEs in response to reception of a positioning request from a positioning entity.

34. The reduced-capability UE of claim 33, wherein the positioning entity comprises a location server or an application running on the reduced-capability UE.

35. The reduced-capability UE of claim 31, wherein the at least one processor causes the at least one transceiver to scan for the premium UEs in response to a notification from a network entity that the one or more premium UEs are within communication range of the reduced-capability UE.

36. The reduced-capability UE of claim 30, wherein the at least one processor being configured to derive comprises the at least one processor being configured to:
adopt the location estimate of the at least one premium UE as the location estimate of the reduced-capability UE.

37. The reduced-capability UE of claim 36, wherein the at least one processor is further configured to:
cause the at least one transceiver to transmit, to the at least one premium UE, a request for the at least one premium UE to transmit the location estimate of the at least one premium UE to a location server.

38. The reduced-capability UE of claim 36, wherein the at least one processor is further configured to:
receive, from the at least one premium UE, the location estimate of the at least one premium UE; and
cause the at least one transceiver to transmit the location estimate of the at least one premium UE to a location server.

39. The reduced-capability UE of claim 30, wherein:
the at least one premium UE comprises a plurality of premium UEs, and
the at least one processor being configured to derive comprises the at least one processor being configured to:
receive a location estimate from each of the plurality of premium UEs; and
average the location estimates of the plurality of premium UEs to generate the location estimate of the reduced-capability UE.

40. A reduced-capability user equipment (UE), comprising:
a memory;
at least one transceiver; and
at least one processor communicatively coupled to the memory and the at least one transceiver, the at least one processor configured to:
cause the at least one transceiver to transmit, to at least one premium UE, a request to perform one or more positioning measurements of one or more downlink reference signals transmitted by one or more transmission-reception points (TRPs), wherein the reduced-capability UE comprises a UE having fewer antennas, lower bandwidth capabilities, lower processing capabilities, lower transmission power, or any combination thereof, than the at least one premium UE, and wherein a frequency of performing the one or more positioning measurements is based on a mobility state of the reduced-capability UE;

receive, from the at least one premium UE, a measurement report comprising the one or more positioning measurements; and determine a location estimate of the reduced-capability UE based on the one or more positioning measurements in the measurement report.

41. The reduced-capability UE of claim 40, wherein the at least one processor is further configured to:

cause the at least one transceiver to transmit, to the at least one premium UE, an indication of how frequently to perform the one or more positioning measurements.

42. The reduced-capability UE of claim 40, wherein the at least one processor is further configured to:

cause the at least one transceiver to transmit, to the at least one premium UE, an indication to stop performing the one or more positioning measurements.

43. The reduced-capability UE of claim 40, wherein the measurement report further comprises identifiers of the one or more TRPs, a timestamp during which the one or more positioning measurements are valid, one or more parameters indicating a quality of the one or more positioning measurements, information about the one or more downlink reference signals that was used to perform the one or more positioning measurements, or any combination thereof.

44. The reduced-capability UE of claim 40, wherein the one or more positioning measurements comprise one or more reference signal time difference (RSTD) measurements, one or more reference signal received power (RSRP) measurements, one or more UE reception-to-transmission (Rx-Tx) measurements, a downlink angle of departure (DL-AoD), or any combination thereof.

45. The reduced-capability UE of claim 40, wherein the at least one processor being configured to determine comprises the at least one processor being configured to:

calculate, by a positioning component of the reduced-capability UE, the location estimate of the reduced-capability UE.

46. The reduced-capability UE of claim 40, wherein the at least one processor being configured to determine comprises the at least one processor being configured to:

cause the at least one transceiver to transmit, to a location server, the measurement report to enable the location server to calculate the location estimate of the reduced-capability UE.

47. The reduced-capability UE of claim 40, wherein the at least one processor is further configured to:

cause the at least one transceiver to scan for premium UEs within communication range of the reduced-capability UE; and cause the at least one transceiver to establish a sidelink connection to the at least one premium UE based on the at least one premium UE being within communication range of the reduced-capability UE.

48. The reduced-capability UE of claim 47, wherein the at least one processor receives the measurement report from the at least one premium UE over the sidelink connection.

49. A premium user equipment (UE), comprising:

a memory;

at least one transceiver; and at least one processor communicatively coupled to the memory and the at least one transceiver, the at least one processor configured to:

receive, from a reduced-capability UE, one or more uplink reference signals, wherein the reduced-capability UE comprises a UE having fewer antennas, lower bandwidth capabilities, lower processing capabilities, lower transmission power, or any combination thereof, than the premium UE; and perform one or more positioning measurements of the one or more uplink reference signals, wherein a location estimate of the reduced-capability UE is calculated based on the one or more positioning measurements, and wherein a frequency of performing the one or more positioning measurements is based on a mobility state of the reduced-capability UE.

50. The premium UE of claim 49, wherein the at least one processor is further configured to:

receive, from the reduced-capability UE, a request to establish a sidelink connection between the premium UE and the reduced-capability UE; and cause the at least one transceiver to establish the sidelink connection with the reduced-capability UE.

51. The premium UE of claim 50, wherein the at least one processor receives the one or more uplink reference signals over the sidelink connection.

52. The premium UE of claim 51, wherein the one or more uplink reference signals transmitted over the sidelink connection for reception at the premium UE have a lower transmit power than uplink reference signals transmitted over a communication link between the premium UE and a macro cell base station.

53. The premium UE of claim 50, wherein the sidelink connection supports a physical sidelink control channel (PSCCH) and/or a physical sidelink control channel (PSSCH).

54. The premium UE of claim 49, wherein the at least one processor is further configured to:

calculate the location estimate of the reduced-capability UE based on the one or more positioning measurements; and cause the at least one transceiver to transmit the location estimate to a location server.

55. The premium UE of claim 49, wherein the at least one processor is further configured to:

calculate the location estimate of the reduced-capability UE based on the one or more positioning measurements; and cause the at least one transceiver to transmit the location estimate to the reduced-capability UE.

56. The premium UE of claim 49, wherein the one or more uplink reference signals comprise one or more sounding reference signals (SRS), one or more uplink positioning reference signals (UL-PRS), or any combination thereof.

57. The premium UE of claim 49, wherein the one or more positioning measurements comprise one or more reference signal received power (RSRP) measurements, one or more UE reception-to-transmission (Rx-Tx) measurements, one or more angle-of-arrival (AoA) measurements, one or more reference signal time difference (RSTD) measurements between pairs of reduced-capability UEs for an uplink time-difference of arrival (UTDOA) positioning procedure, or any combination thereof.

58. The premium UE of claim 49, wherein the at least one processor is further configured to:

cause the at least one transceiver to transmit the one or more positioning measurements to a location server, wherein the location server calculates the location estimate of the reduced-capability UE based on the one or more positioning measurements.

59. A reduced-capability user equipment (UE), comprising:

means for receiving, from each of one or more premium UEs, one or more parameters indicating a quality of a location estimate of the premium UE, wherein the reduced-capability UE comprises a UE having fewer antennas, lower bandwidth capabilities, lower processing capabilities, lower transmission power, or any combination thereof, than the premium UE;

means for selecting at least one premium UE of the one or more premium UEs based on the quality of the location estimate of the at least one premium UE; and means for deriving a location estimate of the reduced-capability UE based on the location estimate of the at least one premium UE, wherein a frequency of deriving the location estimate of the reduced-capability UE is based on a mobility state of the reduced-capability UE.

60. A reduced-capability user equipment (UE), comprising:

means for transmitting, to at least one premium UE, a request to perform one or more positioning measurements of one or more downlink reference signals transmitted by one or more transmission-reception points (TRPs), wherein the reduced-capability UE comprises a UE having fewer antennas, lower bandwidth capabilities, lower processing capabilities, lower transmission power, or any combination thereof, than the at least one premium UE, and wherein a frequency of performing the one or more positioning measurements is based on a mobility state of the reduced-capability UE;

means for receiving, from the at least one premium UE, a measurement report comprising the one or more positioning measurements; and means for determining a location estimate of the reduced-capability UE based on the one or more positioning measurements in the measurement report.

61. A premium user equipment (UE), comprising:

means for receiving, from a reduced-capability UE, one or more uplink reference signals, wherein the reduced-capability UE comprises a UE having fewer antennas, lower bandwidth capabilities, lower processing capabilities, lower transmission power, or any combination thereof, than the premium UE; and means for performing one or more positioning measurements of the one or more uplink reference signals, wherein a location estimate of the reduced-capability UE is calculated based on the one or more positioning measurements, and wherein a frequency of performing the one or more positioning measurements is based on a mobility state of the reduced-capability UE.

62. A non-transitory computer-readable medium storing computer-executable instructions, the computer-executable instructions comprising:

at least one instruction instructing a reduced-capability user equipment (UE) to receive, from each of one or more premium UEs, one or more parameters indicating a quality of a location estimate of the premium UE, wherein the reduced-capability UE comprises a UE having fewer antennas, lower bandwidth capabilities, lower processing capabilities, lower transmission power, or any combination thereof, than the premium UE;

at least one instruction instructing the reduced-capability UE to select at least one premium UE of the one or more premium UEs based on the quality of the location estimate of the at least one premium UE; and at least one instruction instructing the reduced-capability UE to derive a location estimate of the reduced-capability UE based on the location estimate of the at least one premium UE, wherein a frequency of deriving the location estimate of the reduced-capability UE is based on a mobility state of the reduced-capability UE.

63. A non-transitory computer-readable medium storing computer-executable instructions, the computer-executable instructions comprising:

at least one instruction instructing a reduced-capability user equipment (UE) to transmit, to at least one premium UE, a request to perform one or more positioning measurements of one or more downlink reference signals transmitted by one or more transmission-reception points (TRPs), wherein the reduced-capability UE comprises a UE having fewer antennas, lower bandwidth capabilities, lower processing capabilities, lower transmission power, or any combination thereof, than the at least one premium UE, and wherein a frequency of performing the one or more positioning measurements is based on a mobility state of the reduced-capability UE;

at least one instruction instructing the reduced-capability UE to receive, from the at least one premium UE, a measurement report comprising the one or more positioning measurements; and at least one instruction instructing the reduced-capability UE to determine a location estimate of the reduced-capability UE based on the one or more positioning measurements in the measurement report.

64. A non-transitory computer-readable medium storing computer-executable instructions, the computer-executable instructions comprising:

at least one instruction instructing a premium user equipment (UE) to receive, from a reduced-capability UE, one or more uplink reference signals, wherein the reduced-capability UE comprises a UE having fewer antennas, lower bandwidth capabilities, lower processing capabilities, lower transmission power, or any combination thereof, than the premium UE; and at least one instruction instructing the premium UE to perform one or more positioning measurements of the one or more uplink reference signals, wherein a location estimate of the reduced-capability UE is calculated based on the one or more positioning measurements, and wherein a frequency of performing the one or more positioning measurements is based on a mobility state of the reduced-capability UE.

* * * * *